Jan. 18, 1966  T. R. WHITNEY  3,230,532
MICROWAVE RADIOMETER
Filed March 17, 1961  4 Sheets-Sheet 2

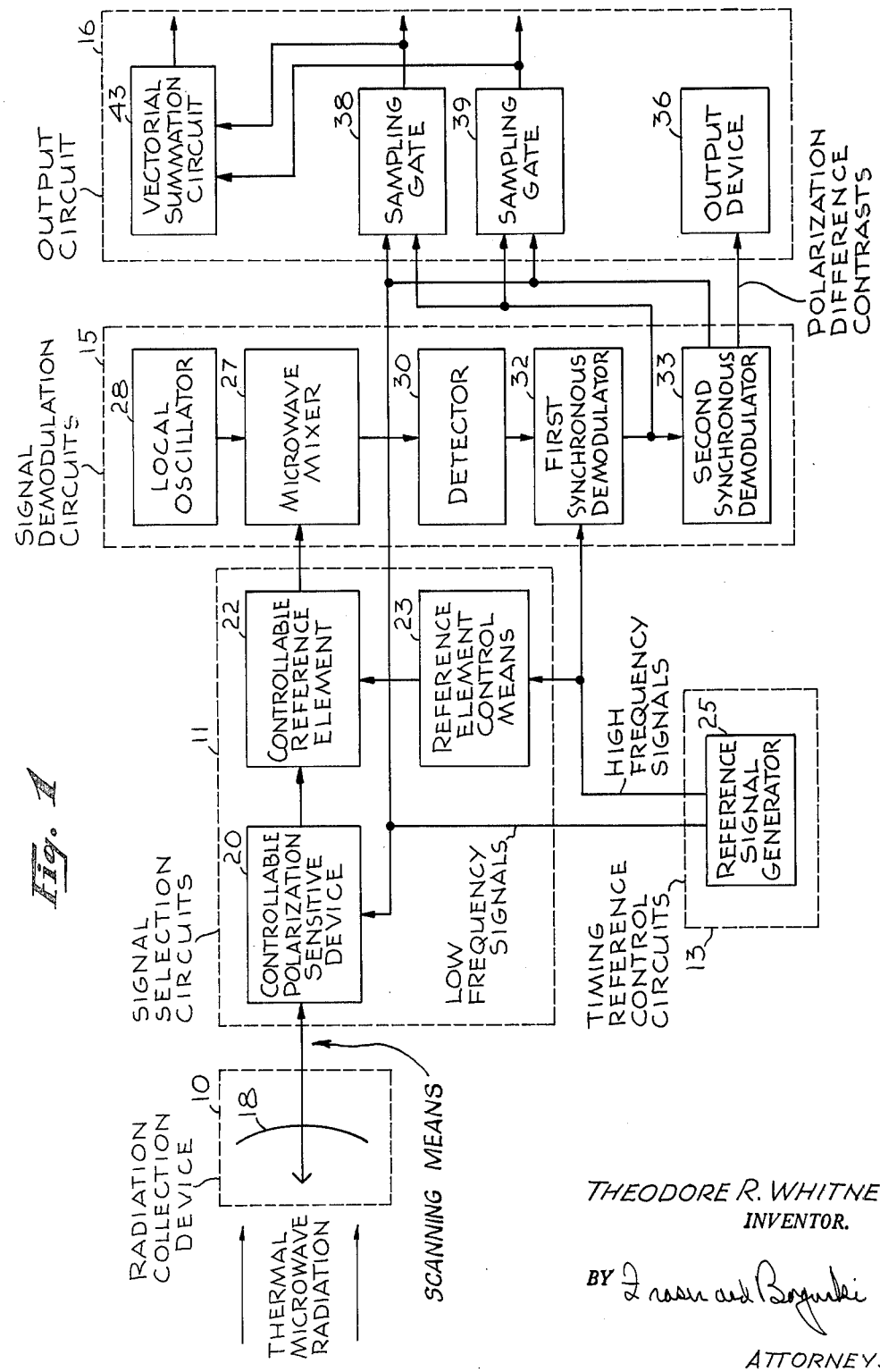

*Fig. 2*

2(A) EXAMPLE OF HORIZONTAL POLARIZATION INTENSITY CONTRASTS DURING SCAN

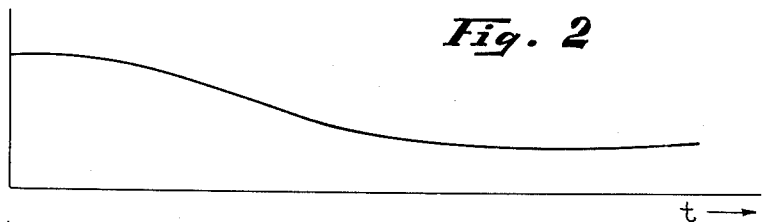

2(B) VERTICAL POLARIZATION INTENSITY CONTRASTS DURING SCAN

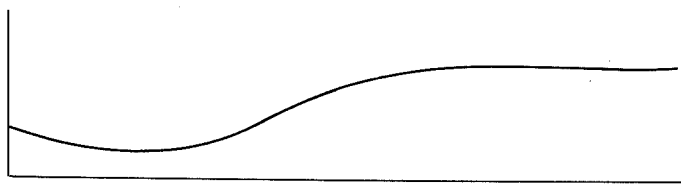

2(C) RESULTANT VECTORS FROM 2(A) & 2(B) VECTORIAL COMPONENT SAMPLING AT DIFFERENT TIMES DIRECTION OF SELECTED POLARIZATION

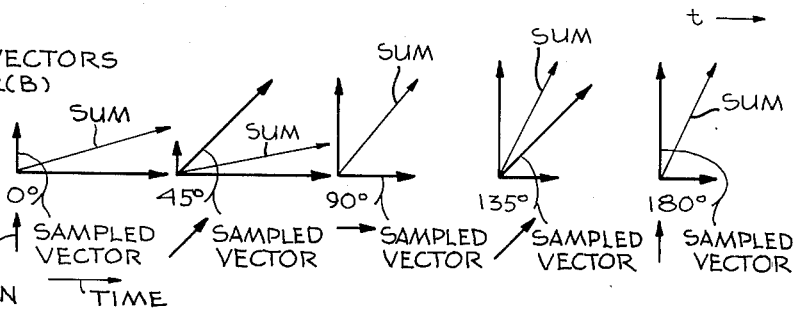

*Fig. 3*

3(A) INTENSITY VARIATION DERIVED BY POLARIZATION SENSITIVE DEVICE 20 FROM POLARIZATION INTENSITY CONTRASTS OF FIG. 2

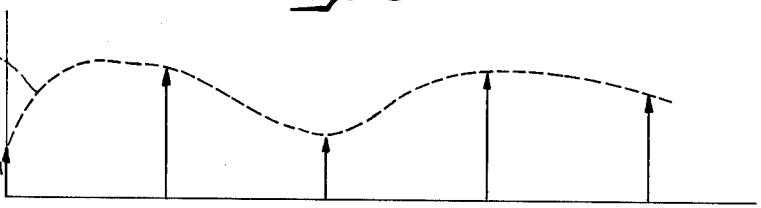

3(B) INTENSITY VARIATION AT REFERENCE ELEMENT

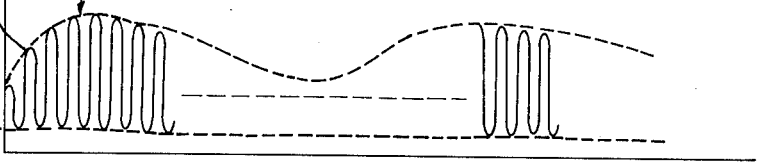

THEODORE R. WHITNEY
INVENTOR.

BY *(signature)*

ATTORNEYS

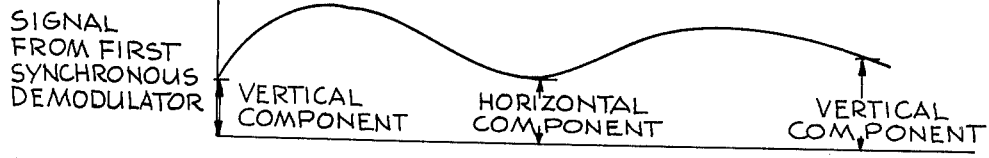
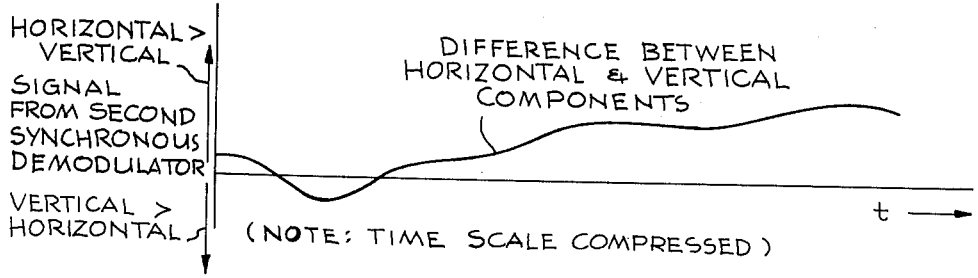
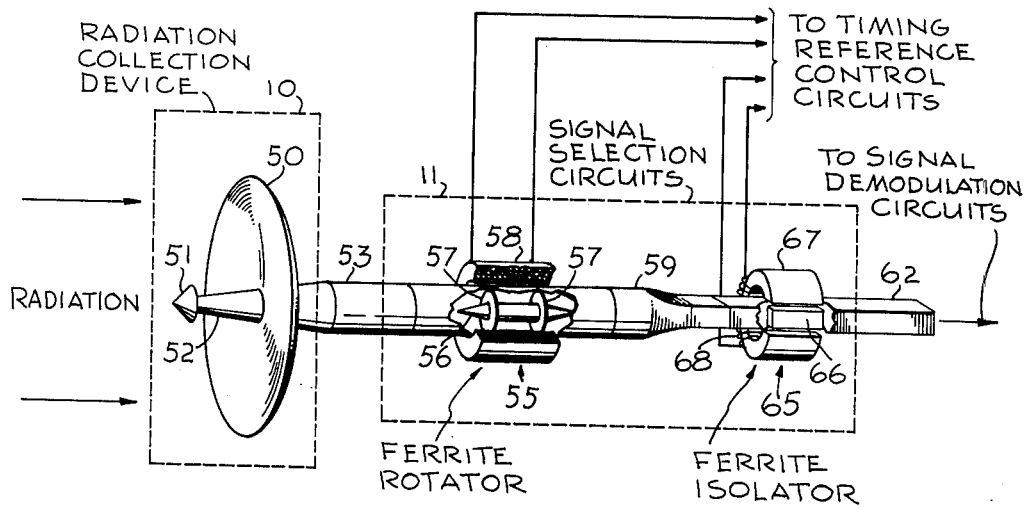

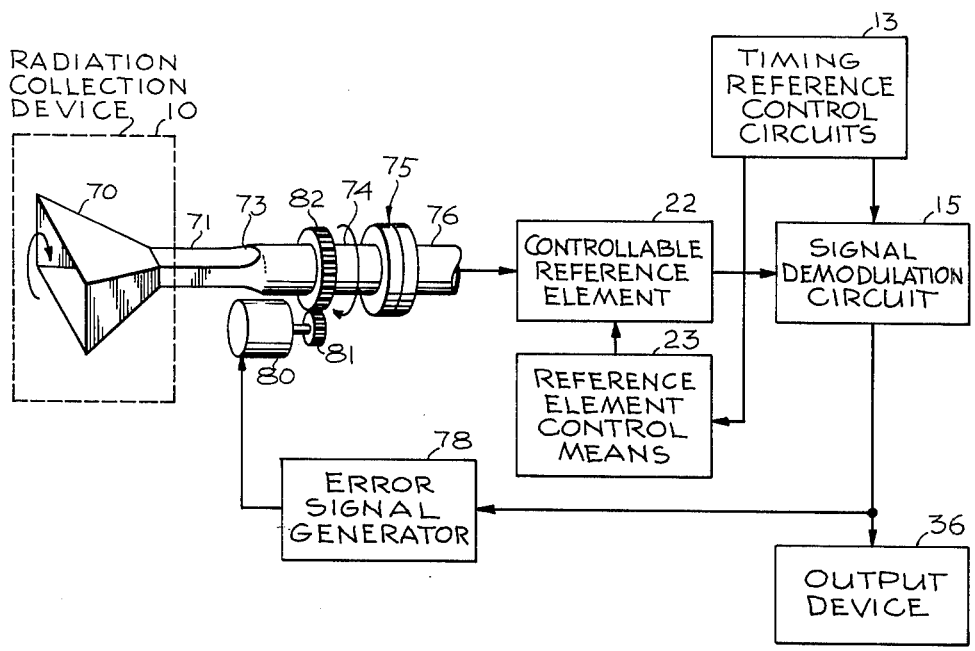

United States Patent Office 3,230,532
Patented Jan. 18, 1966

3,230,532
MICROWAVE RADIOMETER
Theodore R. Whitney, Woodland Hills, Calif., assignor, by mesne assignments, to The Bunker-Ramo Corporation, Stamford, Conn., a corporation of Delaware
Filed Mar. 17, 1961, Ser. No. 96,439
9 Claims. (Cl. 343—100)

This invention relates to radiation distribution analyzing systems, and more particularly to high precision microwave radiometers operating in the millimeter wave region.

When the nature and the distribution of electromagnetic radiation emanating from a given source or volume can be analyzed with sufficient accuracy, the information which is obtained may uniquely characterize the source or volume. Just as one sees a unique pattern resulting from light waves in looking at an object or a space, so, too, the same object or space may present a different, but also unique, pattern in waves of longer length. Thus the science of radiometry is concerned with the high precision analysis of the radiation distributions at specific wave lengths from given sources and volumes.

Much useful information can be derived by radiometer systems operating at millimeter wave lengths in the microwave part of the spectrum. The frequencies involved at these wave lengths are from approximately thirty kilomegacycles (hereafter kmc.) to 300 kmc., and may be spoken of as thermal microwaves. When a radiometer, which usually includes a directional antenna and a highly sensitive receiver, is caused to scan a given zone for radiation at these frequencies, minute variations are discerned within the zone. Thus, for gross determinations, clouds may be distinguished from the sky, and land may be distinguished from water areas. The sensitivity of these systems can be made such, however, that distant stellar radiation sources may not only be identified against an ambient noise and signal background, but may also be analyzed in considerable detail. Minor discontinuities or contrasts of other kinds useful in more prosaic applications may also be distinguished. The horizon may be located by the thermal contrast between sky and earth, thus providing an accurate reference for air and space vehicles. Objects may be located in space or in darkness or other obscured conditions, so that radiometers may be employed for collision warning and ship guidance systems. These are examples merely, and the list of applications may be extended to include weather surveys, surveillance mapping, thermal wake detection and a variety of other situations in which some sort of radiation contrast exists.

Radiometer systems heretofore employed in the millimeter wave range have usually periodically inserted a reference element between the antenna and the receiver so as to substitute a reference signal for the signal from the antenna. The reference signal is effectively subtracted from the collected radiation and an output signal is derived which reveals the manner in which the external radiation changes. Inherent receiver noise is cancelled by this process, and sensitivity is enhanced beyond the limits otherwise imposed by inherent receiver noise.

Electromagnetic radiation at a given wave length may be considered to consist of orthogonal (e.g. horizontal and vertical) polarization components. The conventional radiometer operates so as to respond to changes in only one polarization component. It very often happens that, when scanning a given zone, greater contrasts occur in the difference between the orthogonal components or in the vectorial sum of the polarization components of the radiation than in a single polarization component. In such instances, the best "picture" can be derived by measuring intensity contrasts in the difference between the orthogonal components or in the total radiation, instead of merely changes in radiation having a selected polarization. At the same time, however, useful information may also be derived from different polarization components. It is, therefore, desirable to provide microwave radiometer systems capable of analyzing changes in the difference between orthogonally disposed components and other radiation contrast characteristics for a given source or volume.

In accordance with the present invention, a microwave radiometer system is provided which cyclically samples selected polarization components of collected radiation, and analyzes contrasts in total radiation and the difference between orthogonal components as well as contrasts in individual polarization components.

In accordance with one aspect of the present invention, a microwave radiometer system utilizes a radiation collector which is responsive to polarization components having orthogonally related directivities. Signals from the radiation collector are applied to signal selection circuits including a controllable polarization sensitive device operating at a selected first cyclic rate. Signals accepted by the polarization sensitive device are passed through a transmission section which includes a controllably operable reference element operated at a selected second cyclic rate which is higher than the first. In effect, time distributed readings are taken of particular polarization components in the collected radiation, and these readings are interspersed with readings of the amplitude of the signal from the reference element. The time varying signals thus provided are converted to an output signal by synchronous demodulation means which operate at cyclic rates synchronized to the operation of the controllable reference element and the controllable polarization sensitive device. The output signal changes in accordance with the changes in the difference between the orthogonal polarization components.

In accordance with another aspect of this invention, output indications may be derived to represent contrasts in polarization components of either directivity alone, properly related to the signal generated by the reference element. Alternatively, changes in the individual polarization components may be vectorially combined to yield information about contrasts in total radiation.

Another feature of the invention is the provision of a system for continuously monitoring the vectorial sum of the orthogonal polarization components. The output signal representing the vectorial sum of the orthogonal components is used as a feedback signal to control a polarization rotation device which controls the directivity of the orthogonal polarization components which are sensed.

In accordance with further aspects of this invention, the controllable polarization sensitive device may incorporate, as desired, either a relatively slowly acting device which introduces a sinusoidal variation in the collected radiation or an electronically operated device which provides substantially instantaneous change in sampling from horizontal to vertical polarization components.

A better understanding of the invention may be had by reference to the following description, taken in conjunction with the accompanying drawings, in which:

FIG. 1 is a block diagram of a microwave radiometer in accordance with the invention;

FIG. 2, consisting of views 2(A) through 2(C), is a graph of various polarization intensity relationships useful in explaining the operation of the arrangement of FIG. 1;

FIG. 3, consisting of views 3(A) through 3(D), provides illustrations of various functions and waveforms occurring in the operation of the arrangement of FIG. 1, in conformity with the example of FIG. 2;

FIG. 4 is a simplified perspective view, partially broken away, of a signal selection circuit which may be employed in the arrangement of FIG. 1;

FIG. 5 is a graph representing a waveform arising in the operation of signal selection circuits as shown in FIG. 4; and FIG. 6 is a simplified representation of a radiometer system in accordance with the invention for continuously reading the vectorial sum of orthogonally disposed polarization components in collected radiation.

The microwave radiometer illustrated in FIG. 1, to which reference is now made, provides particular versatility, in that it provides polarization difference information and also a number of different types of radiation contrast information. While the frequency of the radiation which is analyzed may fall anywhere within relatively widely spaced frequency limits, the examples given relate particularly to what has been referred to above as the thermal microwave range. The system given by way of example responds to wave energy of between 3 and 3.3 millimeters in wave length, such waves having a frequency of approximately 100 kmc.

Systems in accordance with the present invention utilize a number of principal components or sub-systems, although these may vary widely in form, or be combined in different ways. These principal elements include a radiation collection device 10, signal selection circuits 11, timing reference circuits 13, signal demodulation circuits 15 and output circuits 16.

The radiation collection device 10 is here shown in simplified form as a parabolic reflector 18 and waveguide combination for transducing radiation of the selected frequency from the space propagation mode to a confined propagation mode. A gimbal mount, and azimuth and elevation drive may be employed, as desired, to provide scanning in rectangular or polar coordinates of a spatial volume which is to be analyzed for radiation contrast patterns at the selected frequency. Signals provided from the radiation collection device 10 are directed through a waveguide transmission system to the signal input terminals of a controllable polarization sensitive device 20. The polarization sensitive device 20 may, for example, include a polarization selective wave transmission element, such as a rotatable rectangular waveguide coupled by appropriate transition elements to adjoining circular waveguide sections. Only plane polarized waves are transmitted through this section which may in turn be coupled to a crossed waveguide to single rectangular waveguide transition. In the present example, the controllable polarization sensitive device 20 is rotated continuously in synchronism with control signals from the timing reference control circuits 13. Control signals of basically low frequency, such as 10 cycles per second are suitable. Thus, the waves transmitted through the polarization sensitive device 20 represent, at different times, only one or the other of the two orthogonal polarization components. For ease of description the two components will be referred to as having horizontal and vertical directivity, although it will be understood that they may have any directions as long as the orthogonal relationship is observed.

In the intermediate interval between the reading or sampling of each polarization component alone, the signal from the polarization sensitive device 20 varies sinusoidally, in correspondence to the vectorial contributions of each of the horizontal and vertical polarization components of the received radiation. The means for operating the controllable polarization sensitive device 20 in synchronism with the low frequency signals from the timing reference control circuits 13 have not been shown in detail in order to simplify the figure.

The signal selection circuits 11 also include a reference element 22 which is controllably inserted into the wave transmission path between the radiation collection device 10 and the signal demodulation circuits 15 so as to modify the transmitted waves. The controllable reference element 22 in prior art devices, usually consists of a periodically operating resistive element which is moved into a waveguide in such fashion as to absorb essentially all waves from the external source. The purpose of the controllable reference element 22 is thus periodically to change the signal provided to the associated circuits between those signals received as collected radiation and a reference signal provided by the radiation of the reference element 22 itself. The temperature of the reference element 22 is at a known and substantially constant level, and the radiation source which appears in the waveguide is at the frequency of interest.

Actual mechanizations usually consist of a motor-driven resistive element and a rectangular waveguide, with the plane of the resistive element lying parallel to the electric field vector of the waves in the dominant mode of propagation in the waveguide. The resistive element is either moved in and out of the waveguide, or is a rotatable element extending into the waveguide but having alternate resistive and nonresistive segments. With either type of device, there are periodically occurring instants in time in which there is substantially lossless transmission of signals generated as the result of the collected radiation, and other, regularly spaced, instants in time in which signals due to collected radiation are substantially totally dissipated. At the latter instants in time the radiation which appears to the associate system is that presented by the presence of the resistive element in the waveguide. In the present example, the waveguide and associated resistive element may be taken to comprise the controllable reference element 22, and the associated motion generating mechanism for the resistive element may be termed a reference element control means 23, which is operated in response to high frequency signals (approximately 300 c.p.s.) from the timing reference control circuits 13. It should be noted that this type of structure introduces sinusoidally varying characteristics in the signal appearing at the output terminals of the signal selection circuits 11.

The timing reference control circuits 13 here include a reference signal generator 25, which may consists of a single reference wave source and appropriate frequency division or frequency multiplication circuits for the generation of related frequencies. The low frequency signals are, by way of illustration only, chosen to be 10 cycles per second, and the high frequency signals 300 cycles per second.

In the signal demodulation circuits 15, signals provided from the signal selection circuits 11 are converted to a lower frequency by heterodyning in a microwave mixer 27 against signals at a selected frequency from a local oscillator 28. The frequency of the local oscillator 28 is selected with relation to the 100 kmc. signals being analyzed, and, in this example, is 90 kmc., in order to provide a signal at a difference frequency of 10 kmc. at the output terminals of the microwave mixer 27. In order to provide signals at 90 kmc. the local oscillator 28 may initially generate relatively low frequency oscillations and include frequency doubler circuits for stepping up these oscillations in frequency to the desired final level. In addition, it will be understood that appropriate band pass filters (not shown) may be used in the wave transmission path of the output signals from the microwave mixer 27, in order to separate the difference signals from other products derived at the mixer 27.

The signals which appear at 10 kmc. are then passed through an envelope detector 30, which may be a crystal detector, to provide a signal which follows the amplitude variations in the 10 kmc. signal which is being processed. The signal thus provided is applied to one input of a first synchronous demodulator 32 which operates under control of the high frequency signals from the timing reference control circuits 13. Output signals from the first synchronous demodulator 32 are passed to the signal input of a second synchronous demodulator 33 which operates under control of low frequency signals from the timing reference control circuits 13. Appropriate phase shift circuits (not shown) may be employed to adjust for lead or lag of the reference signals relative to the desired times of operation of the polarization sensitive device 20 and the reference element 22. Each demodulator 32, 33 is a phase sensitive device such as a ring-bridge demodulator circuit to which input signals and timing reference signals are separately applied. An integrating or other averaging circuit then provides a direct current or low frequency output signal whose amplitude varies in proportion to the signal peaks in the applied input signal. As one example, the ring-bridge circuit shown at page 145 of the book "Transistor Circuit Engineering," by Richard F. Shea et al., published by John Wiley and Sons (1957) may be employed, with the input signals being applied to the transformers $TR_1$ and $TR_2$. The desired direct current difference signal can be provided by any of a number of means, as by using the signal occurring during opposite half-cycles of the reference wave to charge and discharge a storage capacitor. The pass band of the first synchronous demodulator 32 must be sufficiently wide to let through all signal information to be processed at the second synchronous demodulator 33.

The output circuits 16 include an output device 36 which is coupled to the second synchronous demodulator 33. The output device may provide a display or a record, or both, and may consist of a recording oscillograph, a meter or the like. The data presented or recorded by the output device 36 represents the changes or contrasts which appear during the scanning interval in the difference between the vertical and horizontal polarization components of the collected radiation. The output circuits 16 also include means for developing separate signals which represent the contrasts which arise during scanning in the individual orthogonal polarization components. For this purpose a sampling gate 38 has one input terminal coupled to the output terminal of the first synchronous demodulator 32 and a remaining input terminal coupled to receive the low frequency signals from the timing reference control circuits 13. The sampling gate 38 is in effect opened cyclically under control of the low frequency signals to pass parts of the output signal from the first synchronous demodulator 32 (e.g. parts synchronized with positive peaks in the reference wave). A second sampling gate 39 is also responsive to the low frequency reference signals and the signals from the first synchronous demodulator 32, but gates out signals at different times (e.g. times synchronized with negative peaks in the reference wave). The gates 38, 39 provide output signals which represent readings of the amplitude of the horizontal and vertical polarization components.

A further contrast information signal is derived by a vectorial summation circuit 43 coupled to the output terminals of both sampling gates 38, 39. The vectorial summation which is provided represents in amplitude the intensity of the total collected radiation at the frequency of interest. A number of analog computing circuits are available to perform this function, but by way of example the vectorial summation circuit 43 may include circuits for averaging the pulses from the sampling gates 38, 39, signal squaring circuits, a signal adder, and a circuit for deriving the square root of the added signal.

In operation, the arrangement of FIG. 1 concurrently provides signals which represent the difference between the orthogonal polarization components, as well as other contrast information arising during the scanning of a given source or volume. As the radiation collection device 10 moves the antenna 18 through its scanning pattern, all polarization components in the received radiation are applied to the controllable polarization sensitive device 20. The polarization sensitive device 20 then, as it rotates, alternately selects the signal contributions from each of the orthogonally related polarization components at its relatively low frequency rate (10 c.p.s.). A better understanding of this signal selection may be had by reference to FIG. 2, in which FIG. 2(A) gives an example of how the intensity of a horizontal polarization component may change during a certain time interval, and FIG. 2(B) gives an example of how vertical polarization components may change in intensity during the same time interval. As seen in these examples, the horizontal and vertical polarization components change independently of each other.

The vectorial relationships which arise on passing signals representing polarization components which vary with time in this manner through a rotating polarization sensitive device 20 are shown in FIG. 2(C). In FIG. 2(C) are represented the various vectorial distributions which exist at successive selected times in the time varying functions of the horizontal and vertical polarization components represented in FIGS. 2(A) and 2(B). At the selected points in time the polarization sensitive device is assumed to be at a certain designated angle, such as 0°, 45°, 90°, and so forth. Moving to the right along the time axis of FIGS. 2(A) and 2(B), the first sample which is taken shows a relatively small vertical polarization component and a relatively large horizontal polarization component. At this point in time, however, the sampling effected by the polarization sensitive device 20 is responsive only to the vertical polarization component, as indicated at the 0° position, and so the signal which is transferred to the associated circuits contains contributions only from the vertical polarization components. At the time of the next succeeding sample which is shown, the sampling vector is at 45°, so that the signal which is derived from the polarization sensitive device 20 contains .707 of the vertical polarization component and .707 of the horizontal polarization component. At the point in time at which the next succeeding sample is taken, at the 90° position, the polarization sensitive device 20 is responsive only to horizontal polarization components. Because the polarization sensitive device 20 is responsive to the magnitudes only of the respective orthogonal components of collected radiation, there is no difference in its response for a particular angle or the supplement thereof. Thus, the sampling vectors at 135° and 180° are shown in the positions of 45° and 0° respectively.

It can be seen, therefore, that there is sampling or reading at the particular instants in time of the signal contributions received from horizontal polarization components alone, or from vertical polarization components alone. At intermediate times there is a sinusoidal variation between the limits defined by the horizontal and vertical polarization components.

For the example of horizontal polarization and vertical polarization components given in FIGS. 2(A) and 2(B), the intensity variation derived by the controllable polarization sensitive device 20 is essentially as is shown in FIG. 3(A). The dotted line represents one envelope of a signal at 100 kmc. In FIG. 3(A) the time base along which the successive vectorial contributions are distributed is the same as that used in FIG. 2.

The signal subsequently derived upon operation of the controllable reference element 22 is also a 100 kmc. signal but, because of the sinusoidal modulation introduced by the reference element, varies between limits defined by the instantaneous magnitudes of the signal from the polarization sensitive device 20 and the radiation emanating from the reference element itself. The envelope thus defined remains the same when the 100 kmc. carries signal is converted to a lower frequency by heterodyning in the microwave mixer 27, against signals from the local oscillator 28. The envelope also remains when the lower frequency (here 10 kmc.) microwave signal is passed through the microwave detector 30. Thereafter, however, the desired radiation contrast information is extracted through use of the first and second synchronous demodulators 32 and 33.

The signal from the first synchronous demodulator 32 is a low frequency signal (FIG. 3(C)) which varies in accordance with the signal contributions from the two orthogonally related polarization components during the successive sampling times. These signals are referenced, however, to the amplitude of the signal contributions from the reference element 22, so that inherent receiver noise is effectively cancelled in usual radiometer fashion. Output signals provided from the second synchronous demodulator 33 effectively represent the difference (FIG. 3 (D)) between the vertical and the horizontal polarization components of the collected radiation. The signal from the second synchronous demodulator 33, as represented on a different time base in FIG. 3(D), corresponds generally to the difference between the horizontal polarization component (FIG. 2(A)) and the vertical polarization component (FIG. 2(B)). Here the signal from the second synchronous demodulator 33 is positive when the horizontal polarization component is greater than the vertical polarization component, and negative when the contrary is true. Because the radiation pattern from the volume being scanned usually changes only slowly, many more samples may be taken without appreciable amplitude change than in the example shown.

The polarization difference contrast information which is provided to the output device 36 is the output signal from the second synchronous demodulator 33. By reference to FIG. 2(C), it may be seen that the polarization difference information varies more widely than does either polarization component represented in FIG. 2. The use of polarization difference contrasts may therefore be highly beneficial, particularly when conventional systems yield little contrast information. In a practical example, this may be compared to viewing a cloudy sky through a hazy atmosphere. The haze may effectively obscure much of the pattern of the clouds, as represented by the contrasts in a selected polarization component at a selected radiation frequency. There may be a sharp difference between the polarization reflectivity characteristics of clouds and the surrounding haze, however, for a different polarization component so that the polarization difference contrasts might much more clearly define the outline of the clouds. Many other examples might be given of objects or bodies which present like radiation intensities at the selected wave length, but widely different polarization component relationships.

Simultaneously with the generation of polarization difference contrast information, however, the signals provided from the sampling gates 38 and 39 in the output circuit 16 may be used to indicate the time varying contrasts which arise in the two individual orthogonal polarization components. For vertical polarization, for example, the sampling gate 38 is opened under control of positive-going half cycles of the low frequency signals, so as to pass pulses whose amplitude corresponds to that of the vertical polarization component alone. These pulses may be applied to an integrating circuit or some other form of pulse stretcher, so as to provide a direct current signal which reveals contrasts in the vertical polarization component as the radiation selector scans the given source or volume. Concurrently, the other sampling gate 39 in like manner provides a signal representing contrast in the horizontal polarization component.

Operation of the vectorial summation circuit 43 completes the analysis of the contrast information available in the collected radiation. The total intensity of the radiation at the selected wave length will also, at times, provide more sharply defined contrast information that the other types of contrasts mentioned. In any event it is useful in analyzing the energy distribution in the volume under examination.

Systems in accordance with the invention may also utilize electronic signal selection circuits 11 of much higher speed than those employed in the system discussed above in conjunction with FIG. 1. One such high speed system is shown in FIG. 4. The radiation collection device 10 may include a parabolic deflector 50, a secondary reflector or splash plate 51 and a feed waveguide 52 forming an antenna system which provides electromagnetic wave energy at the selected wave length to a circular waveguide 53. As in FIG. 1, the means for providing a scanning motion to the parabolic reflector 50 and associated antenna elements have not been shown. The relative dimensions of the reflector 50 and waveguide elements 52 and 53 are not to scale, some having been exaggerated for clarity.

In the signal selection circuits 11 of FIG. 4, the circular waveguide 53 includes a ferrite rotator section 55, including an elongated ferrite element 56 positioned along the central axis of the section. The ferrite element 56 is held in its axial position relative to the waveguide 53 by dielectric disc supports 57 and is encompassed by an external magnetizing coil 58 which provides an axial magnetic field in the region of the ferrite element 56. The magnetizing coil is energized by signals from the timing reference control circuits (not shown in FIG. 4). This axial or longitudinal magnetic field is selected to be of a sufficient strength to provide a 90° rotation of the plane of polorization for electromagnetic waves transmitted along the waveguide 53. When the magnetizing coil 58 is not energized, the waves are transmitted through the waveguide 53 without rotation.

From the ferrite rotator section 55, the waves are passed through a circular to rectangular guide transition section 59, and then to a rectangular waveguide 62. The rectangular waveguide 62 provides polarization selectivity because (in its dominant mode) it transmits only those wave electric vectorial components which are transversed to the broad walls of the waveguide 62 and rejects vectorial components having other directivities. The rectangular waveguide section 62 includes a ferrite isolator 65 which provides a radiation reference corresponding to the selectively insertable reference element of the arrangement of FIG. 1. The ferrite isolator 65 includes a ferrite element 66 positioned parallel to the longitudinal axis of the rectangular waveguide section 62 and in a plane transverse to the broad walls of the waveguide. An externally mounted magnetic core element 67 partially encompasses the rectangular waveguide 62 and has pole faces which abut against the broad walls of the waveguide 62, adjacent the edges of the ferrite element 66. In response to actuating signals from the timing reference control circuits, a coil 68 wound about the core 67 magnetizes the core 67 to provide a transverse field through the rectangular waveguide 62. The transverse field is of proper strength and polarity to maintain the ferrite element 66 at gyromagnetic resonance with the waves transmitted along the rectangular waveguide secion 62. When the coil 68 is energized, therefore, waves originating with the radiation collection device 10 are substantially fully attenuated in the ferrite isolator 65, and when the coil 68 is not energized there is substantially no attenuation in the rectangular waveguide section 62.

It should be recognized that the ferrite rotator 55 and the ferrite isolator 65 merely provide examples of the types of high speed devices which may be employed in the signal selection circuits 11. The details of the high speed devices themselves may be varied widely in accordance with conventional practice.

In operation, the signal selection circuits of FIG. 4 sample two orthogonally disposed polarization components in the collected radiation at high speed, and also provide cyclic comparison of the sampled waves to reference radiation. This may be thought of as square or rectangular reference wave operation, in contrast to the sinusoidal variations provided by the arrangement of FIG. 1. The reference signals are here rectangular waveforms having high and low frequencies. The operation may be better understood by reference to FIG. 5, in which the intensity variations with time of two orthogonally related polarization vectors are plotted. By way of illustration, the two orthogonally related polarization components are assumed to follow different time varying amplitude functions for the time interval represented.

In response to the low frequency signals from the timing reference control circuits, the ferrite rotator 55 operates periodically, rotating the plane of polarization of waves in the circular waveguide 53 by 90°. Thus the waves are alternately rotated 90° and passed through without rotation for equal intervals of time. The polarization selective rectangular waveguide 62 thus alternately samples first one polarization component and then the orthogonally related component. The ferrite isolator 65 is concurrently actuated by the high frequency signals from the timing reference control circuits and alternately transmits and attenuates the signal, substituting the reference radiation of the ferrite element 66 itself during the attenuation periods.

Thus the signals which are provided to the signal demodulation circuits follow the time varying characteristic represented in FIG. 5, which, it should be remembered, represents only the envelope of the signals at the selected millimeter wave length. By signal demodulation techniques, the four different kinds of contrast information which are contained in the time varying signals may again be extracted. For example, signals representative of only one polarization component may be sampled to provide a conventional radiometer reading. The orthogonally related polarization component may also be sampled at the same time, however, and a reading may be taken of this component as well as the difference between the two orthogonally related polarization components. By vectorial combination of the horizontal and vertical polarization components, as described in conjunction with FIG. 1, readings may also be taken of contrasts in the vector sum of the collected radiation.

Yet another type of radiation contrast information may be derived by operating the radiometer as a servo system which tracks the vectorial sum of the collected radiation components. One such arrangement is shown in FIG. 6, and includes a radiation collection device 10 which is polarization selective and which is varied to accept different polarization components, dependent upon the components themselves at given instants in time. A rectangular horn antenna 70 terminating in a rectangular waveguide 71 is rotatably mounted in suitable bearings (not shown). The rotational attitude of the horn antenna 70 determines the direction of the polarization components from the received radiation which are applied to the system. From the rectangular waveguide 71 the waves are conducted along a rectangular to circular waveguide transition 73 and a circular waveguide section 74 to a rotary circular waveguide joint 75. The rotary joint 75 provides a conventional coupling between the rotatable circular waveguide section 74 and a fixed circular waveguide section 76, and has therefore not been illustrated in detail. The fixed circular waveguide 76 is coupled to a controllable reference element 22 arranged in a system similar to that of FIG. 1.

This arrangement utilizes an error signal generator 78 which receives the output signal from the signal demodulation circuits 15 and rotates the horn antenna 70 so as to maintain the output signal at a maximum. The error signal is applied to a servo motor 80 which turns the rotatable circular waveguide 74 through a pair of gears 81, 82. In effect, the system seeks to follow the vectorial sum of the orthogonally related polarization components of the collected radiation. The output signal therefore presents the contrasts occurring in the vector sum of the radiation of the selected wave length. Because of the fact that the maximum sample is taken, greatest contrast information will usually be derived.

Systems in accordance with the present invention may derive information from the signal selection circuits 11 in a number of ways other than those here described. In conventional microwave radiometers, for example, a band pass filter which is tuned to the frequency of operation of the reference element is used to obtain a wave whose amplitude is dependent upon the difference between the signals due to collected radiation and the noise of the reference element. Then the amplitude of the signal in this wave is distinguished by detecting in synchronism with the operation of the reference element. After passing the signal thus derived through a low pass filter, a visual indication may be provided on an ammeter of the absolute temperature of the source or volume which is being scanned. The use of such an arrangement and systems in accordance with the present invention would require merely a separate filter and phase sensitive detector arrangement for each of the synchronous demodulators illustrated in FIG. 1. Likewise, in systems of the prior art considerable care has been taken to lower noise and other fluctuations, and the techniques utilized in these regards may be employed here as well.

In any event, the ability to observe the contrasts in different radiation which occur when scanning a given volume, greatly increases the versatility of microwave radiometers. In another sense, sensitivity is increased because of the fact that the different component contrasts which are observed vary more widely than contrasts in a single polarization component.

While there have been described above and illustrated in the drawings various forms of microwave radiometers in accordance with the invention which enable the derivation of polarization contrast information, it will be appreciated that the invention is not limited thereto. Accordingly, the invention should be considered to include all modifications, variations and alternative forms falling within the scope of the appended claims.

What is claimed is:

1. A microwave radiometer including the combination of radiation collection means responsive to orthogonally disposed polarization components of electromagnetic wave radiation in a selected wave length range, cyclically operable polarization sensitive means coupled to the radiation collection means and alternately accepting signals contributed from individual ones of the orthogonally disposed polarization components of the radiation, cyclically operable reference signal generating means coupled to the polarization sensitive means for cyclically substituting reference signals for the signals accepted by the polarization sensitive means, and signal demodulating means coupled to the reference signal generating means for developing signals representing contrasts in the difference between the orthogonally disposed polarization components.

2. A microwave radiometer including the combination of radiation collection means responsive to orthogonally disposed polarization components of electromagnetic wave radiation in a selected wave length range for scanning a given volume, cyclically operable polarization sensitive means coupled to the radiation collection means for alternately sampling signals contributed from the individual orthogonally disposed polarization components of the radiation, cyclically operable reference radiation means coupled to the polarization sensitive means for cyclically substituting reference signals at the selected wave length for the signals accepted by the polarization sensitive means, signal demodulating means coupled to the reference radiation means for developing signals representing contrasts in the difference between the orthogonally disposed polarization components, and in the individual polarization components, and output circuit means responsive to contrasts in the individual polarization components for generating signals representing contrasts in the vectorial sum of the orthogonally disposed polarization components as the radiation collection means scans the given volume.

3. A microwave radiometer including the combination of radiation collection means responsive to orthogonally disposed polarization components of electromagnetic wave radiation, polarization sensitive means operating at a first cyclic rate and coupled to the radiation collection means for alternately accepting signals contributed from the individual orthogonally disposed polarization components of the radiation, reference signal generating means operating at a second selected cyclic rate coupled to the polarization sensitive means for cyclically substituting reference signals for the signals accepted by the polarization sensitive means, first signal demodulating means operating at the second cyclic rate and coupled to the reference signal generating means for developing a signal representing the difference between the polarization components of the collected radiation and the reference signal, and second signal demodulating means coupled to the first signal demodulating means and operating at the first cyclic rate for developing signals representing the difference between the two orthogonally disposed polarization components.

4. A microwave radiometer including the combination of a microwave radiation collector responsive to orthogonally disposed polarization components of electromagnetic waves, first controllable means coupled to the radiation collector for selecting individual ones of the orthogonally disposed polarization components of electromagnetic waves, means for operating the controllable means with a selected first cyclic rate to alternate between the orthogonally disposed polarization components at the first rate, controllable reference signal generating means coupled to the controllable means and responsive to signals therefrom for substituting reference signals for signals derived from the controllable means, means coupled to operate the controllable reference signal generating means with a selected second cyclic rate, first signal demodulating means coupled to the reference signal generating means and operating at the second rate, and second signal demodulating means coupled to the first signal demodulating means and operating at the first rate.

5. A microwave radiometer for operation in the millimeter wave length region and including the combination of an antenna responsive to selected frequencies of millimeter wave radiation containing time varying vertical and horizontal polarization components, a polarization sensitive device coupled to receive signals from the antenna, timing reference signal generator means providing high and low frequency signals, the polarization sensitive device being coupled to receive the low frequency signals and to alternately accept horizontal and vertical polarization components of the received radiation, a cyclically operable reference signal source providing a reference signal of the same frequency as the received radiation, means coupling the polarization sensitive device to the reference signal source, reference signal source control means responsive to the high frequency signals for operating the reference signal source in synchronism with the high frequency signals, a local oscillator device operating at a fixed difference frequency from the selected frequencies of received radiation, microwave mixer means coupled to receive signals from the reference signal source and the local oscillator device for providing an intermediate frequency signal, a first synchronous demodulator coupled to receive high frequency signals from the timing reference signal generator means and from the mixed means, the first synchronous demodulator operating to provide a signal which varies cyclically at the high frequency between limits determined by the differences of the amplitude of the signals from the vertical and horizontal polarization components of the received radiation and the reference signal, and a second synchronous demodulator coupled to receive signals from the first synchronous demodulator and low frequency signals from the timing reference signal generator providing a direct current output signal representative of the difference between the vertical and horizontal polarization components present in the received radiation.

6. A microwave radiometer for operation in the millimeter wave length region and for analyzing different sources of radiation at a selected frequency by contrasts in the difference between orthogonally disposed polarization components of received radiation at the selected frequency, including the combination of an antenna positioned to receive radiation and to transduce the radiation to a confined wave guide mode including both the orthogonally disposed polarization components thereof, a reference wave source providing timing reference signals at a first reference frequency and at a second selected reference frequency substantially higher than the first reference frequency, a controllable polarization sensitive device coupled to receive the wave energy in the confined waveguide mode from the antenna, the polarization sensitive device operating at the first reference frequency alternately to accept individual ones of the orthogonally disposed polarization components of the received radiation, a controllably operable reference radiation source coupled to the polarization sensitive device and providing an amplitude reference signal at the selected frequency while attenuating signal contributions from the selected polarization components, means responsive to the second selected timing reference signal for operating the reference radiation source, a local oscillator device providing a fixed local oscillator signal at a frequency having a fixed difference from the selected frequency of the received radiation, a microwave mixer coupled to receive signals from both the reference radiation source and the local oscillator device and to provide a radio frequency signal at an intermediate frequency, a detector coupled to the microwave mixer, a first synchronous demodulator coupled to the detector, the first synchronous demodulator also being coupled to receive the second reference signal, thus to operate in synchronism with the reference radiation source to provide a first demodulated signal varying in time at the first timing reference frequency and in amplitude alternately with the different orthogonally disposed polarization components of the received radiation, taken with respect to the amplitude reference signal, and a second synchronous demodulator coupled to receive the first demodulated signal and to provide a second demodulated signal, the second synchronous demodulator operating at the first timing reference frequency in synchronism with the polarization sensitive device to provide a signal representing the difference in amplitude between the orthogonally disposed polarization components.

7. A microwave radiometer for concurrently providing a number of different types of contrast information from radiation derived from a given source including the combination of radiation collection means responsive to orthogonally disposed polarization components of radiation from the given source, means providing timing reference signals, means responsive to the timing reference signals and to the radiation collection means for alternately sampling the orthogonally disposed polarization components, signal gating means responsive to the samples of the orthogonally disposed polarization components and to the timing reference signals for generating signals representing contrasts in the individual polarization components, vectorial summation means coupled to the signal gating means for deriving signals representing contrasts in the total radiation collected, and means responsive to the samples of the orthogonally disposed polarization components for providing signals representing contrasts in the difference between the polarization components.

8. A microwave radiometer for concurrently providing a number of different types of contrast information from radiation derived at a selected wave length from a given source including the combination of radiation collection means responsive to orthogonally disposed polarization components of radiation at the selected wave length from the given source, means coupled to the radiation collection means for alternately sampling the orthogonally disposed polarization components, signal gating means responsive to the samples of the orthogonally disposed polarization components for generating signals representing contrasts in the individual polarization components, and vectorial summation means coupled to the gating means for deriving signals representing contrasts in the total radiation collected.

9. A microwave radiometer for analyzing contrasts in the maximum difference between orthogonally disposed polarization components of selected wave length including radiation collection means responsive to radiation of the selected wave length, controllable polarization sensitive means coupled to the radiation collection means, timing reference signal generating means, means coupled to the controllable polarization sensitive means and to the timing reference signal generating means for providing an output signal representing the vectorial sum of the polarization components, and means responsive to the output signal for controlling the polarization sensitive means to maintain the output signal at a maximum.

References Cited by the Examiner
UNITED STATES PATENTS

| | | | |
|---|---|---|---|
| 2,257,783 | 10/1941 | Bowen | 333—17 |
| 2,857,575 | 10/1958 | Zaleski | 333—17 |
| 3,028,596 | 4/1962 | McGillem et al. | 343—100 |

CHESTER L. JUSTUS, *Primary Examiner.*